(12) United States Patent
Singh et al.

(10) Patent No.: US 12,598,186 B2
(45) Date of Patent: *Apr. 7, 2026

(54) INTELLIGENT RESOURCE ALLOCATION BASED ON SECURITY PROFILE OF EDGE DEVICE NETWORK

(71) Applicant: Bank of America Corporation, Charlotte, NC (US)

(72) Inventors: Shailendra Singh, Thanes (IN); Satyajeet Priyadarshi, Pune (IN); Nicholas Pershing Schwartz, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 670 days.

This patent is subject to a terminal disclaimer.

(21) Appl. No.: 17/744,887

(22) Filed: May 16, 2022

(65) Prior Publication Data

US 2023/0370468 A1     Nov. 16, 2023

(51) Int. Cl.
*H04L 9/40* (2022.01)

(52) U.S. Cl.
CPC ........ *H04L 63/102* (2013.01); *H04L 63/1425* (2013.01); *H04L 63/1433* (2013.01); *H04L 63/20* (2013.01)

(58) Field of Classification Search
CPC ............... H04L 63/102; H04L 63/1425; H04L 63/1433; H04L 63/20
See application file for complete search history.

(56) References Cited

U.S. PATENT DOCUMENTS

| | | |
|---|---|---|
| 2004/0048596 A1 | 3/2004 | Wyrzykowska et al. |
| 2004/0066770 A1 | 4/2004 | Pabla et al. |
| 2004/0208556 A1 | 10/2004 | Joly et al. |
| 2005/0198366 A1 | 9/2005 | Kreiner et al. |
| 2008/0025290 A1 | 1/2008 | Barkai |
| 2008/0025318 A1 | 1/2008 | Knazik et al. |
| 2009/0271502 A1 | 10/2009 | Xue et al. |
| 2010/0054153 A1 | 3/2010 | White et al. |
| 2012/0113864 A1 | 5/2012 | Bosneag et al. |
| 2012/0243442 A1 | 9/2012 | Musku et al. |

(Continued)

FOREIGN PATENT DOCUMENTS

| | | | |
|---|---|---|---|
| JP | 4523921 B2 | * | 8/2010 |
| WO | WO-2023107128 A1 | * | 6/2023 |

*Primary Examiner* — Alexander Lagor
*Assistant Examiner* — Felicia Farrow

(57) ABSTRACT

A system includes an edge network with edge devices configured to execute computing tasks of the edge network and an edge network management system with a resource deployment subsystem and a quantum computing subsystem. The resource deployment subsystem determines properties of the edge network, detects an anomaly using the properties of the edge network, and determines one or more simulated attacks for testing the edge network. The quantum computing subsystem is configured to execute the simulated attacks in a plurality of available configurations of the edge network and determine a security score for each of the configurations. The resource deployment subsystem then determines a selected configuration based at least in part on the security score determined for each of configurations and implements the selected configuration at the edge network.

20 Claims, 3 Drawing Sheets

(56)                References Cited

U.S. PATENT DOCUMENTS

| | | |
|---|---|---|
| 2013/0111008 A1 | 5/2013 | Black et al. |
| 2013/0191499 A1 | 7/2013 | Ludin et al. |
| 2015/0016462 A1 | 1/2015 | Zhou |
| 2015/0381384 A1 | 12/2015 | Visser et al. |
| 2017/0006497 A1 | 1/2017 | Thubert et al. |
| 2018/0007117 A1 | 1/2018 | Ludin et al. |
| 2018/0146041 A1 | 5/2018 | Moustafa et al. |
| 2018/0248894 A1* | 8/2018 | Greeter .............. H04L 63/1425 |
| 2019/0014040 A1 | 1/2019 | Yerrapureddy et al. |
| 2019/0104138 A1* | 4/2019 | Storms ................ H04L 63/1416 |
| 2019/0190950 A1 | 6/2019 | Senecal et al. |
| 2019/0230143 A1 | 7/2019 | Ludin et al. |
| 2020/0021110 A1 | 1/2020 | Boundy et al. |
| 2020/0059529 A1 | 2/2020 | Moustafa et al. |
| 2020/0067982 A1 | 2/2020 | Leach et al. |
| 2020/0177703 A1 | 6/2020 | Panda et al. |
| 2020/0195661 A1 | 6/2020 | Chou et al. |
| 2020/0229037 A1 | 7/2020 | Agarwal et al. |
| 2020/0244537 A1 | 7/2020 | Hagy |
| 2020/0244673 A1* | 7/2020 | Stockdale ........... H04L 63/1433 |
| 2020/0327371 A1* | 10/2020 | Sharma ................... H04L 67/34 |
| 2020/0366561 A1 | 11/2020 | Zhao et al. |
| 2020/0366733 A1 | 11/2020 | Parvataneni et al. |
| 2020/0404073 A1 | 12/2020 | Huang et al. |
| 2021/0022043 A1 | 1/2021 | Soryal |
| 2021/0105228 A1 | 4/2021 | Joseph et al. |
| 2021/0120032 A1 | 4/2021 | St. Pierre |
| 2021/0149803 A1 | 5/2021 | Bernat |
| 2021/0226987 A1 | 7/2021 | Summers et al. |
| 2021/0227011 A1 | 7/2021 | Long et al. |
| 2021/0235316 A1 | 7/2021 | Huang et al. |
| 2021/0314357 A1 | 10/2021 | Leach et al. |
| 2021/0377359 A1 | 12/2021 | Moustafa et al. |
| 2022/0014423 A1 | 1/2022 | Smith et al. |
| 2022/0086186 A1 | 3/2022 | Senecal et al. |
| 2022/0141090 A1 | 5/2022 | Deng et al. |
| 2022/0201042 A1* | 6/2022 | Crabtree ............. G06F 16/2477 |
| 2022/0216924 A1* | 7/2022 | Rahman ................. H04B 10/70 |
| 2022/0360653 A1* | 11/2022 | Wouhaybi ........ G05B 19/41835 |
| 2024/0330727 A1* | 10/2024 | Singh ....................... G06N 3/08 |

* cited by examiner

INTELLIGENT RESOURCE ALLOCATION BASED ON SECURITY PROFILE OF EDGE DEVICE NETWORK

TECHNICAL FIELD

The present disclosure relates generally to distributed networks, and more specifically to intelligent resource allocation based on security profile of edge device network.

BACKGROUND

In distributed networks, computational tasks are distributed amongst and performed by various devices or nodes in the network. For example, a request may be sent from a user's device and computational tasks may be performed in separate centralized devices, sometimes referred to as the cloud devices, with results returned to the user's device. Edge computing is an emerging framework in which computing tasks of a distributed network are largely performed by network devices or nodes nearer the edge of the network, or nearer to the user's device. Fog computing provides communication between the edge computing devices and the centralized cloud network. There exists a need for improved technology for reliably and securely operating networks that employ edge and fog computing.

SUMMARY

This disclosure recognizes that providing reliable information security is a major challenge for edge and fog network systems. Since information processing is increasingly being performed by devices located close to the edge of a network, susceptibility to malicious actions may be increased. Possible attacks include, but are not limited to, resource exhaustion attacks, API abuse attacks, and denial of service attacks. This disclosure recognizes the previously unmet need for a dynamic and intelligent mechanism for allocating computing resources based on the security profile of edge device networks using threat propensity as an optimization factor.

Certain embodiments of this disclosure are integrated into the practical application of an edge network management system that provides improved reliability and security for an edge network, for example, by detecting anomalous changes to the edge network, simulating potential attacks on the changed edge network, determining a more secure configuration for preventing the stimulated attacks, and automatically implementing the more secure configuration of the edge network (e.g., by reconfiguring edge devices and/or fog devices of the network). For example, the disclosed system provides several technical advantages which may include: 1) improved security of edge network devices by automatically reconfiguring the edge network to a more secure configuration determined using quantum optimization; 2) rapid and reliable identification of security issues before they can be used by bad actors; and 3) improved reporting of potential security vulnerabilities via a contextual alert that indicates potential security issues associated with the configuration of the edge network at any given moment. As such, this disclosure may improve the function of computer systems used to operate edge networks. For example, the system described in this disclosure may make edge networks more secure and efficient. Certain embodiments of this disclosure may include some, all, or none of these advantages. These advantages and other features will be more clearly understood from the following detailed description taken in conjunction with the accompanying drawings and claims.

In an embodiment, a system includes an edge device network with a plurality of edge devices configured to execute computing tasks of the edge network and an edge network management system with a resource deployment subsystem and a quantum computing subsystem. The resource deployment subsystem includes a processor configured to determine properties of the edge device network, determine an anomaly is detected based at least in part on the properties of the edge device network, and after determining the anomaly is detected, determine one or more simulated attacks for testing the edge device network. The quantum computing subsystem is configured to execute the at least one of the one or more simulated attacks in a plurality of available configurations of the edge device network and determine, based at least in part on results of the executed simulated attacks, a security score for each of the plurality of configurations. The resource deployment subsystem is further configured to determine a selected configuration of the plurality of available configurations of the edge device network based at least in part on the security score determined for each of the plurality of configurations and implement the selected configuration at the edge device network.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
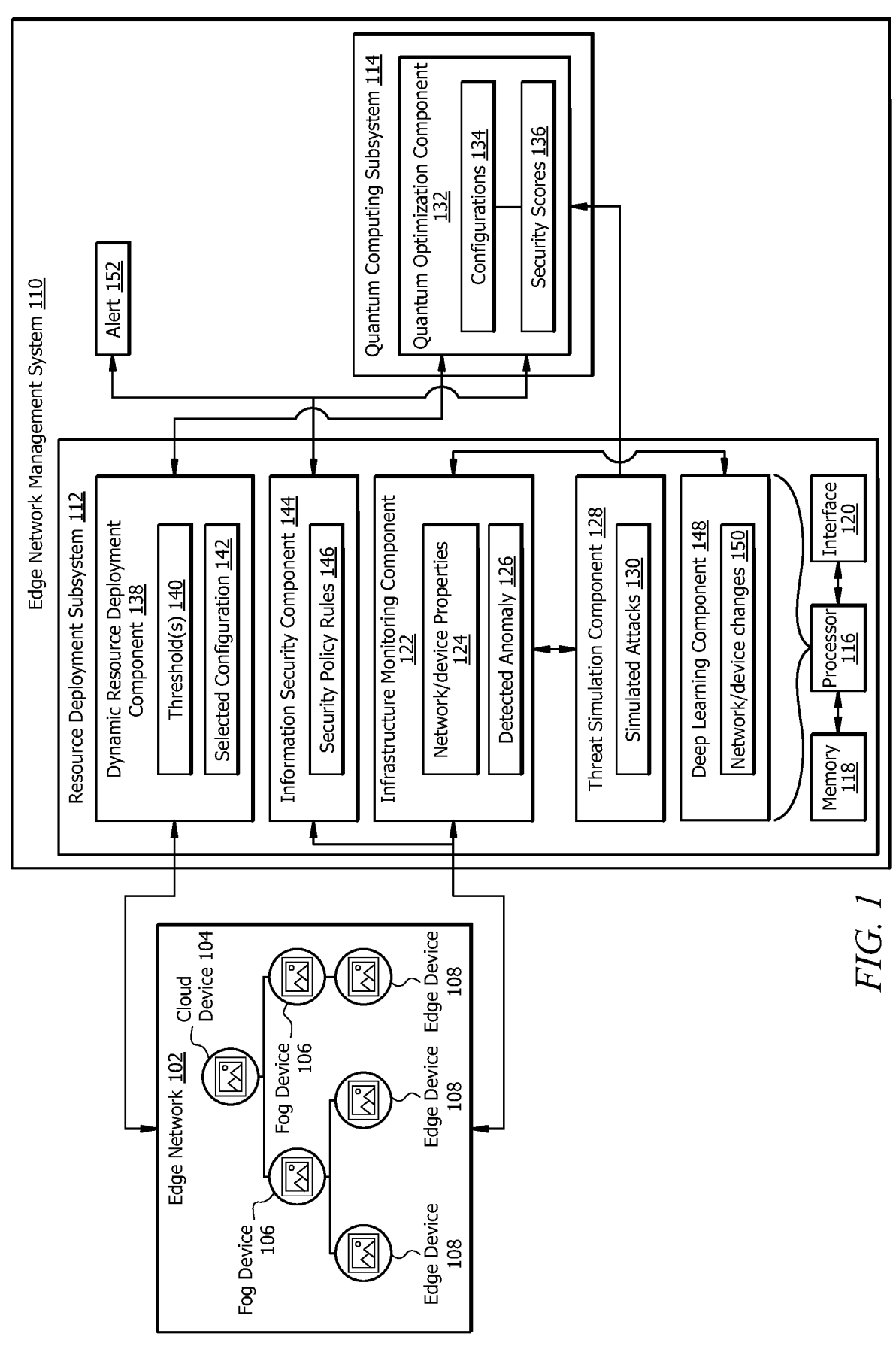
FIG. 1 is a diagram illustrating an embodiment of an edge network management system.
Figure 2:
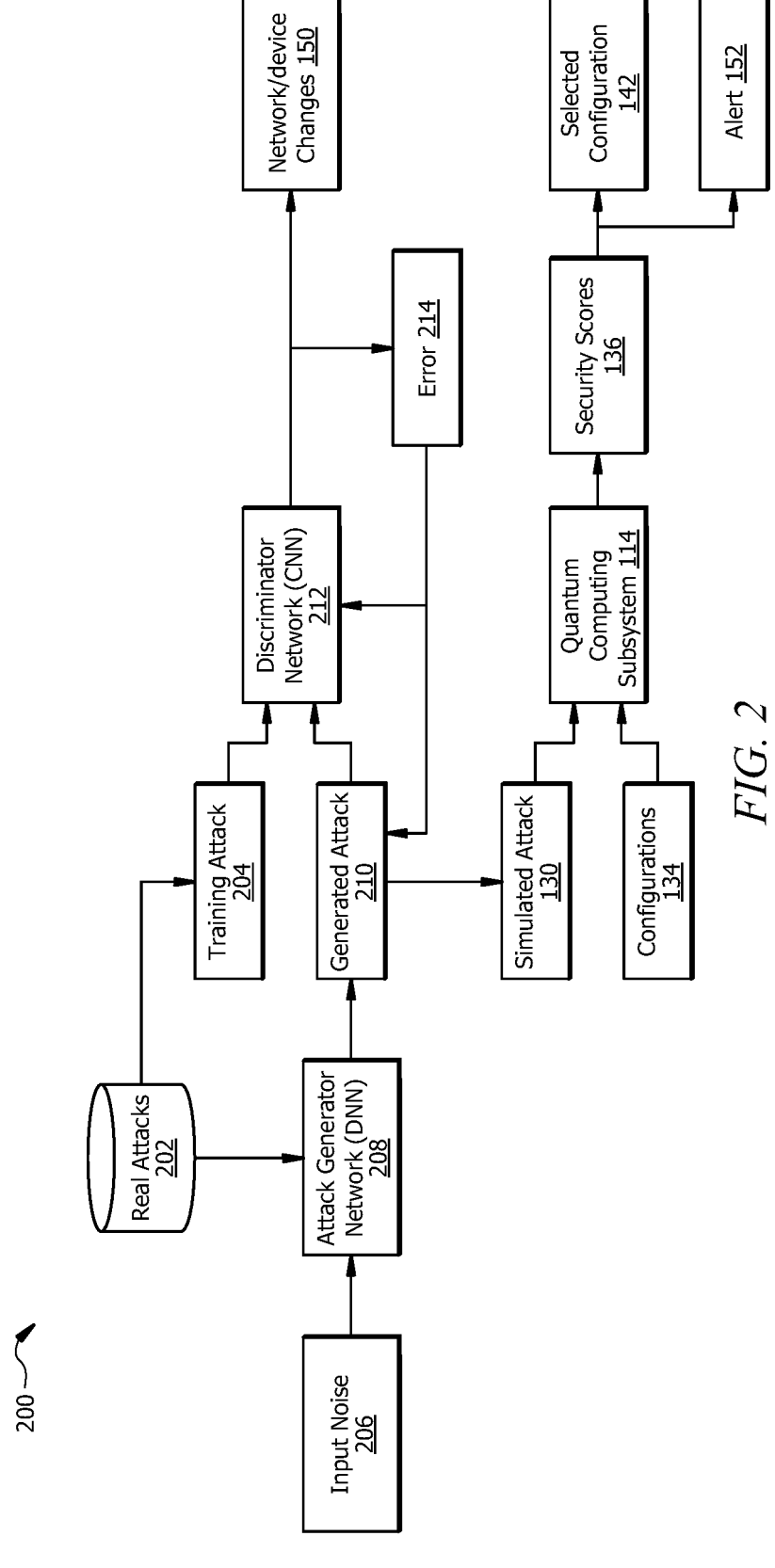
FIG. 2 is a flow diagram illustrating a process for training and using the deep learning component and threat simulation component of the system of FIG. 1.
Figure 3:
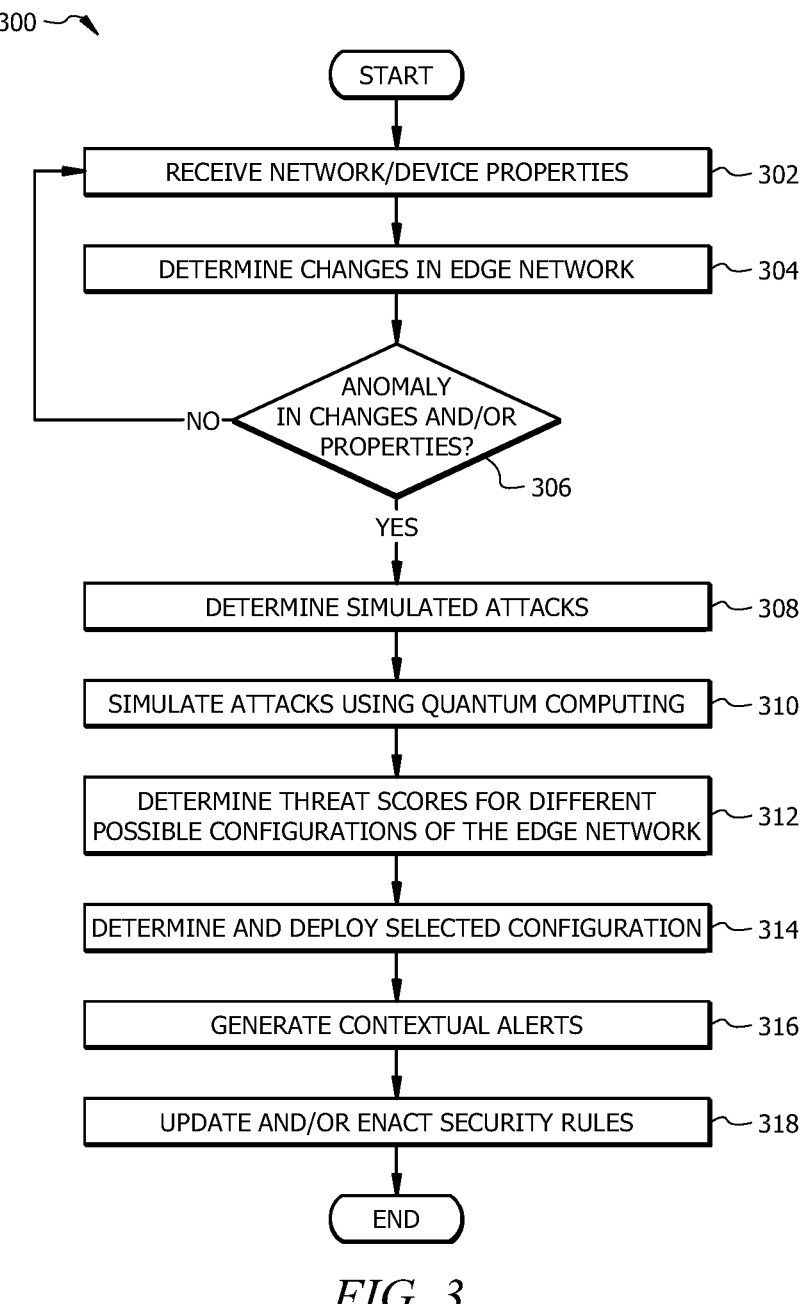
FIG. 3 is a flowchart illustrating an example method of operating the system of FIG. 1.

This disclosure recognizes problems of previous edge networking technology. For example, the unique approach of this disclosure uses an intelligent edge network management system that dynamically allocates computing resources based on security profiles of a managed edge device network. The security profiles include security scores that are determined using attack simulation and quantum optimization. The system analyzes edge and fog device network infrastructure in near real time using deep learning algorithms and identifies properties or factors that may make the network infrastructure prone to potential security compromise. Identified properties of the edge network are provided to a quantum computing subsystem, which simulates attacks on the network. Multiple configuration scenarios are simulated simultaneously leading to a large number of resource configuration states having various levels of security scores corresponding to the threat propensity of the configurations. One or more states or configurations that are stable and have sufficiently low security score are selected and used to deploy/allocate computing resources at the edge network. FIG. 1 shows an example system in which an edge network is managed by the new edge network management system of this disclosure. FIG. 2 illustrates a portion of an example process for training and using various neural networks employed by the system of FIG. 1. FIG. 3 shows an example method of operating the system of FIG. 1 to improve security and efficiency of a managed edge network.

Edge Network Management System

FIG. 1 shows an example system 100 that includes an edge network 102 and an edge network management system 110 for improving the security and reliability of the edge network 102. The edge network management system 110 generally monitors the edge network 102 and adjusts the network's configuration to provide improved security, efficiency, and reliability. The edge network management system 110 dynamically detects real-world changes to the edge network 102, performs simulation and quantum optimization of the edge network 102, and adjusts operation of the edge network 102 accordingly to reduce or prevent security compromise, while also improving efficiency of the edge network 102.

Edge Network

The edge network 102 (also referred to herein as an "edge device network") is a distributed computational network that includes centralized cloud devices 104, fog devices 106, and a number of distributed edge devices 108. The fog devices 106 act as intermediaries between the distributed edge devices 108 and the cloud devices 104. In a typical implementation of the edge network 102, the bulk of the computational tasks performed by the edge network 102 are executed by the edge devices 108. In this way, information is more immediately available at the edge devices 108 for distribution to other local devices in communication with the edge devices 108 (not illustrated in FIG. 1 for clarity and conciseness). However, this disclosure contemplates some portion of computational tasks being performed by fog devices 106 and/or cloud devices 104. As described in greater detail below, the configurations of the edge devices 108 and/or fog devices 106 may be adjusted by the edge network management system 110 to improve the overall efficiency, security, and reliability of the edge network 102. For instance, security policy rules 146 for the edge network 102 may be adapted over time by the edge network management system 110 to counter security threats that are anticipated to be possible in based on the performed simulations.

Edge Network Management System

The edge network management system includes a resource deployment subsystem 112 and a quantum computing subsystem 114. The resource deployment subsystem 112 generally monitors the edge network 102 and dynamically adjusts how resources are deployed to the edge network 102 for improved efficiency, security, and reliability, as described further below. The quantum computing subsystem 114 simulates various available, or possible, configurations 134 of the edge network 102 to aid in the selection of a selected configuration 142 that optimizes resource utilization by the edge network 102, while also helping to prevent potential security compromise at the edge network 102. Further details and examples of the resource deployment subsystem 112 and quantum computing subsystem 114 and their operation are provided below and with respect to FIG. 3.

Resource Deployment Subsystem

The resource deployment subsystem 112 includes a processor 116, a memory 118, and a network interface 120. The processor 116 includes one or more processors. The processor 116 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 116 may be a programmable logic device, a microcontroller, a microprocessor, or any suitable combination of the preceding. The processor 116 is communicatively coupled to and in signal communication with the memory 118 and network interface 120. The one or more processors are configured to process data and may be implemented in hardware and/or software. For example, the processor 116 may be 8-bit, 16-bit, 32-bit, 64-bit or of any other suitable architecture. The processor 116 may include an arithmetic logic unit (ALU) for performing arithmetic and logic operations, processor registers that supply operands to the ALU and store the results of ALU operations, and a control unit that fetches instructions from memory 118 and executes them by directing the coordinated operations of the ALU, registers and other components.

The memory 118 is operable to store any data, instructions, logic, rules, or code operable to execute the functions of the resource deployment subsystem 112. The memory 118 may store instructions for implementing any of the operations described in this disclosure. For example, the memory 118 includes instructions for executing by the processor 116 the operations of the various components 122, 128, 138, 144, 148 of the resource deployment subsystem 112. The memory 118 includes one or more disks, tape drives, or solid-state drives, and may be used as an over-flow data storage device, to store programs when such programs are selected for execution, and to store instructions and data that are read during program execution. The memory 118 may be volatile or non-volatile and may comprise read-only memory (ROM), random-access memory (RAM), ternary content-addressable memory (TCAM), dynamic random-access memory (DRAM), and static random-access memory (SRAM).

The network interface 120 is configured to enable wired and/or wireless communications. The network interface 120 is configured to communicate data between the resource deployment subsystem 112 and other network devices, systems, or domain(s), such as the quantum computing subsystem 114 and the edge network 102. The network interface 120 is an electronic circuit that is configured to enable communications between devices. For example, the network interface 120 may include one or more serial ports (e.g., USB ports or the like) and/or parallel ports (e.g., any type of multi-pin port) for facilitating this communication. As a further example, the network interface 120 may include a WIFI interface, a local area network (LAN) interface, a wide area network (WAN) interface, a modem, a switch, or a router. The processor 116 is configured to send and receive data using the network interface 120. The network interface 120 may be configured to use any suitable type of communication protocol.

Quantum Computing Subsystem

The quantum computing subsystem 114 includes a quantum computer. The quantum computing subsystem 114 may include a quantum processing unit (QPU), a qubit signal amplifier, input microwave lines, superconducting coaxial lines, a mixing chamber, cryogenic isolators, quantum amplifiers, a cryoperm shield, quantum logical gates, and/or any other suitable components for generating and/or processing quantum bits, or qubits. In some embodiments, the quantum computing subsystem 114 may be located within a quantum network, which may include optical fibers, optical switches, repeaters, and/or any suitable type of hardware and communication channels for transmitting and receiving qubits. The quantum computing subsystem 114 is also configured to be in signal communication with the resource deployment subsystem 112. In this configuration, the quantum computing subsystem 114 is configured to exchange (i.e., send and receive) data with the resource deployment subsystem 112. In some embodiment, the quantum computing subsystem 114 may be integrated with or configured to work cooperatively with the resource deployment subsystem 112 and/or a traditional computing device, such as a desktop computer or a laptop.

The quantum computing subsystem 114 employs one or more quantum algorithms to execute the operations described in this disclosure. For example, the quantum computing subsystem 114 may execute a quantum approximate optimization algorithm (QAOA) to determine approximate solutions to optimization problems. In some embodiments, the quantum computing subsystem 114 may use quantum annealing to determine the global minimum of a given objective function over a given set of candidate solutions. These or similar algorithms may be employed to run or execute simulated attacks 130 on a range of available configurations 134 of the edge network 102 and perform functions of the quantum optimization component 132, as described in greater detail below.

Operation of the Edge Network Monitoring System

The resource deployment subsystem 112 includes an infrastructure monitoring component 122. The infrastructure monitoring component 122 monitors the edge network 102 and determines factors or properties 124 of the edge network 102. The properties 124 include any features of the edge network 102 and/or individual devices 104, 106, 108 of the edge network 102 that may be linked to potential security compromise and/or may impact efficiency of the edge network 102. For instance, the properties 124 may include IP addresses of edge devices 108 and/or fog devices 106, hardware configurations of edge devices 108 and/or fog devices 106, software executed by edge devices 108 and/or fog devices 106, and the like. The infrastructure monitoring component 122 detects an anomaly 126 in the configuration and/or operation of the edge network 102. The anomaly 126 may be detected based on the properties 124. For example, if the properties 124 are determined to be outside a predefined range of property values, an anomaly 126 may be detected. For example, if a property 124 for network traffic at a given edge device 108 exceeds a predefined value, an anomaly 126 may be detected for that edge device 108.

In some cases, a deep learning component 148 of the resource deployment subsystem 112 may be employed to transform the monitored properties 124 into more contextually relevant network/device changes 150. The network/device changes 150 may provide more contextual information about whether the set of monitored properties 124 is likely to be associated with a potential vulnerability to security compromise and should be included in models used for quantum optimization (see description of the quantum optimization component 132 below). For example, network/device changes 150 may be more informative or relevant for detecting a potential anomaly 126 and for effectively testing simulated attacks 130 on the edge network 102 using the quantum computing subsystem 114, as described further below. For example, the deep learning component 148 may determine a network/device change 150 corresponding to an increase in the average amount of memory (e.g., random-access memory or RAM) utilized in a time interval by a given edge device 108. Such a change 150 may be associated with a potential malicious attack on the edge device 108 where a bad actor attempts to compromise the edge network 102 by one or more attacks, such as distributed denial-of-service attacks, direct memory access attacks, volumetric attacks, and the like.

The deep learning component 148 may employ one or more neural networks to determine changes 150 (see FIG. 2 and corresponding description below for further examples). The anomaly 126 may be detected based at least in part on the changes 150. For example, an anomaly 126 may correspond to a change in hardware or hardware configuration of one or more edge devices 108 and/or fog devices 106, a change in software or software configuration of one or more edge devices 108 and/or fog devices 106, and/or a change in security policy of one or more edge devices 108 and/or fog devices 106.

After determining the detected anomaly 126, the threat simulation component 128 of the resource deployment subsystem 112 determines one or more simulated attacks 130 for testing the edge device network 102. The simulated attacks 130 may mimic properties of previously observed real-world attacks. For example, simulated attacks 130 may include features of distributed denial-of-service attacks, direct memory access attacks, volumetric attacks, and the like. The simulated attacks 130 may be determined using a neural network as described in greater detail below with respect to the example of FIG. 2.

The simulated attacks 130 are then run by a quantum optimization component 132 of the quantum computing subsystem 114 using a number of possible or available configurations 134 of the edge network 102. Each configuration 134 represents a possible configuration of the properties 124 of the edge network 102. For example, in different configurations 134, edge devices 108 may have different software available, different working memory, and the like in order to determine how variations in configurations 134 impact the edge network's resilience when faced with a simulated attack 130. For instance, the available configurations 134 of the edge network 102 may configurations in which the edge devices 108 and/or fog devices 106 have modified memory capacity (e.g., RAM is added or removed from various edge devices 108 and/or fog devices 106), modified application privileges (e.g., various edge devices 108 and/or fog devices 106 are either allowed or denied to execute certain application), modified access to data (e.g., various edge devices 108 and/or fog devices 106 are either allowed or denied to access certain data), and/or modified encryption settings (e.g., various edge devices 108 and/or fog devices 106 either do or do not encrypt certain data or use certain type of encryption).

For each configuration 134 tested by the quantum optimization component 132, a security score 136 is determined that quantifies the susceptibility of the configuration 134 to the simulated attack 130. A lower security score 136 corresponds to a decreased susceptibility to the simulated attack 130. Individual security scores 136 may be determined for different nodes or devices 104, 106, 108 of the edge network 102, and an overall security score 136 may be determined from the individual scores 136 (e.g., as a weighted or un-weighted average).

The dynamic resource deployment component 138 of the resource deployment subsystem 112 then determines a selected configuration 142 based at least in part on the security scores 136 and implements the selected configuration 142. The selected configuration may be the configuration 134 with the lowest security score 136. The selected configuration 142 may be the configuration 134 that both improves the efficiency with which resources of the edge network 102 are utilized and has a security score 136 that is below a security score threshold 140. In other words, the selected configuration 142 may be a configuration that both improves efficiency and security of the edge network 102.

The resource deployment subsystem 112 may implement the selected configuration 142 at the edge network 102 by adjusting hardware resources allocated to the edge network 102 (e.g., to the fog devices 106 and/or edge devices 108), adjusting software configurations of the edge devices 108 and/or fog devices 106 of the edge network 102, or both. If a given edge device 108 had an individual security score 136 greater than the threshold 140, then that edge device 108 may be quarantined at least temporarily.

The information security component 144 of the resource deployment subsystem 112 may use the security scores 136 to adjust security policy rules 146 of the edge network 102 based at least in part on the security scores 136. The security policy rules 146 may include rules or policies for: (i) allowing or denying application access privileges for one or more edge devices 108 and/or fog device 106, (ii) allowing or denying data access to one or more edge devices 108 and/or fog device 106, (iii) requiring additional data validation at one or more edge devices 108 and/or fog device 106, (iv) requiring data encryption at one or more edge devices 108 and/or fog device 106, (v) requiring increased data monitoring at one or more edge devices 108 and/or fog device 106, (vi) quarantining one or more one or more edge devices 108 and/or fog device 106, (vii) requiring geofencing of one or more edge devices 108 and/or fog device 106, and (vii) blocking data transmission to and/or from one or more edge devices 108 and/or fog device 106. Certain security policy rules 146 may be shared by the edge network 102 as a whole, while others are specific to specific devices 104, 106, 108 or classes of devices 104, 106, 108 used to implement the edge network 102.

The information security component 144 of the resource deployment subsystem 112 may provide an alert 152. For example, if the security scores 136 for one or more devices 104, 106, 108 and/or for the overall edge network 102 are above the threshold 140, an alert 152 may be provided to indicate the potential susceptibility of the edge network 102 to security compromise. An alert 152 may include information about actions taken by the edge network management system 110 to improve operations of the edge network 102 (e.g., such that an administrator is aware of changes made by the resource deployment subsystem 112). The information included in the alert 152 may provide context of the deployment changes made by the resource deployment subsystem 112. For example, when a selected configuration 142 is implemented, the alert 152 may identify the potential security vulnerabilities being avoided and/or the devices 104, 106, 108 of the edge network that have improved security.

In an example operation of the system 100, network/device properties 124 are received by the resource deployment subsystem 112 and used to determine, by the deep learning component 148, an increase 150 in the random-access memory being used by an edge device 108 of the edge network 102. Simulated attacks 130 are generated to test the resiliency of the edge network 102 with this change 150 and the edge network 102 in one or more other available configurations 134.

FIG. 2 shows a flow diagram 200 of example operations used for training and using the deep learning component 148 and the threat simulation component 128. These components 128, 148 may include an attack generator network 208 and a discriminator network 212, which are operated as a generative adversarial network (GAN) to determine simulated attacks 130 rapidly and reliably for use by the quantum computing subsystem 114 and changes 150 that can be simulated in the various configurations 134, as described above with respect to FIG. 1. The attack generator network 208 is a deconvolutional neural network (DNN) that receives a real attack 202 and input noise 206 as an input and outputs a generated attack 210. The generated attack 210 is provided as input to the discriminator network 212 along with the real attack 202 that is used as a training attack 204. The discriminator network 212 is a convolutional neural network (CNN) that outputs the determined network/device changes 150, as described with respect to FIG. 1 above. The discriminator network 212 may also determine an error 214 that is backpropagated to update the weights used for determining a generated attack 210 and by the discriminator network 212.

Referring to both FIGS. 1 and 2, once training is complete, the generated attack 210 may be used as a simulated attack 130 using the quantum optimization component 132. Security scores 136 are determined for each simulated configuration 134. If the current configuration has a security score 136 below a predefined threshold 140, an alert 152 may be provided and an alternative configuration 134 may be implemented to improve performance of the edge network 102. For example, a selected configuration 142 may be implemented that allocates additional computational resources to the edge device 108 that was experiencing an increase in memory usage.

Example Method of Operating an Edge Network Management System

FIG. 3 illustrates an example method 300 of operating the edge network management system 110 of FIG. 1. The method 300 may be implemented using the hardware components of the edge network management system 110, including, for example, the processor 116, memory, 118, network interface 120 of the resource deployment subsystem 112 and the quantum computing subsystem 114. The method 300 may begin at operation 302 where network/device properties 124 are received. As described with respect to FIG. 1 above, the network/device properties 124 may include any features or factors of the edge network 102 and/or individual devices 104, 106, 108 of the edge network 102 that may be linked to potential security compromise and/or may impact efficiency. For instance, the properties 124 may include IP addresses of edge devices 108 and/or fog devices 106, hardware configurations of edge devices 108 and/or fog devices 106, software executed by edge devices 108 and/or fog devices 106, and the like.

At operation 304, the edge network management system 110 determines changes 150 in the edge network 102. For example, the deep learning component 148 of the edge network management system 110 may determine a network/device change 150 corresponding to an increase or decrease in the average amount of computational resources (e.g., RAM) utilized in a time interval by a given edge device 108, a change in software used by an edge device 108, and/or a change in security settings of an edge device 108. Such a change 150 may be associated with a potential malicious attack on the edge device 108 where a bad actor attempts to compromise the edge network 102 by one or more attacks, such as distributed denial-of-service attacks, direct memory access attacks, volumetric attacks, and the like, as described with respect to FIG. 1 above. FIG. 2 and the corresponding description above also provides an example operation of the deep learning component 148 used to determine changes 150 to the edge network 102.

At operation 306, the edge network management system 110 determines whether an anomaly 126 is detected based on the properties 124 of operation 302 and/or the changes 150 determined at operation 304. For example, an anomaly 126 may be detected based on the properties 124. For example, if the properties 124 are outside a predefined range of property values, an anomaly 126 may be detected. For example, if a property 124 for network traffic at a given edge device 108 exceeds a predefined value, an anomaly 126 may be detected for that edge device 108. As another example, an anomaly 126 may be detected based at least in part on the changes 150 from operation 304. For example, an anomaly 126 may correspond to a change in hardware or hardware configuration of one or more edge devices 108 and/or fog devices 106, a change in software or software configuration of one or more edge devices 108 and/or fog devices 106, and/or a change in security policy of one or more edge devices 108 and/or fog devices 106. If an anomaly 126 is detected, the edge network management system 110 proceeds to operation 308. Otherwise, the edge network management system 110 returns to the start of method 300.

At operation 308, the edge network management system 110 determines one or more simulated attacks 130 for testing the security, efficiency, and/or reliability of the edge network 102. For example, the simulated attacks 130 may mimic properties of previously observed real-world attacks. For example, simulated attacks 130 may include features of distributed denial-of-service attacks, direct memory access attacks, volumetric attacks, and the like. FIG. 2 and the corresponding description above also provides an example operation of the threat simulation component 128 used to determine simulated attacks 130 on the edge network 102.

At operation 310, the edge network management system 110 simulates one or more of the attacks 130 from operation 308 using a number of available configurations 134 of the edge network 102. The available configurations 134 may include configurations of the edge network 102 in which the edge devices 108 and/or fog devices 106 have modified memory capacity (e.g., RAM is added or removed from various edge devices 108 and/or fog devices 106), modified application privileges (e.g., various edge devices 108 and/or fog devices 106 are either allowed or denied to execute certain application), modified access to data (e.g., various edge devices 108 and/or fog devices 106 are either allowed or denied to access certain data), and/or modified encryption settings (e.g., various edge devices 108 and/or fog devices 106 do or do not encrypt certain data or use certain type of encryption).

At operation 312, the edge network management system 110 determines a security score 136 for each tested configuration 134 and/or for individual devices 104, 106, 108 of the edge network 102 in each of the configurations 134. The security scores 136 may quantify the susceptibility of the configuration 134 to the simulated attack 130. A lower security score 136 corresponds to a decreased susceptibility to the simulated attack 130.

At operation 314, the edge network management system 110 determines and deploys a selected configuration 142. The selected configuration 142 may be the configuration 134 with the lowest security score 136. The selected configuration 142 may be the configuration 134 that both improves efficiency with which resources of the edge network 102 are utilized and has a security score 136 that is below a threshold 140. Further examples of determining the selected configuration 142 are provided above with respect to FIG. 1.

At operation 316, the edge network management system 110 generates a contextual alert 152. For example, if the security scores 136 for one or more devices 104, 106, 108 and/or for the overall edge network 102 are above the threshold 140, an alert 152 may be provided to indicate the potential susceptibility to security compromise. The alert 152 may include information about actions taken by the edge network management system 110 to improve operations of the edge network 102 (e.g., such that an administrator is aware of changes made by the resource deployment subsystem 112). The information included in the alert 152 may provide context of the deployment changes made by the resource deployment subsystem 112. For example, when a selected configuration 142 is implemented, the alert 152 may identify the potential security vulnerabilities being avoided and/or the devices 104, 106, 108 of the edge network that have improved security.

At operation 318, the edge network management system 110 may update and/or enact security policy rules 146. For example, the edge network management system 110 may adjust security policy rules 146 of the edge network 102 based at least in part on the security scores 136. The security policy rules 146 may include rules or policies for: (i) allowing or denying application access privileges for one or more edge devices 108 and/or fog device 106, (ii) allowing or denying data access to one or more edge devices 108 and/or fog device 106, (iii) requiring additional data validation at one or more edge devices 108 and/or fog device 106, (iv) requiring data encryption at one or more edge devices 108 and/or fog device 106, (v) requiring increased data monitoring at one or more edge devices 108 and/or fog device 106, (vi) quarantining one or more one or more edge devices 108 and/or fog device 106, (vii) requiring geofencing of one or more edge devices 108 and/or fog device 106, and (vii) blocking data transmission to and/or from one or more edge devices 108 and/or fog device 106.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
an edge device network comprising a plurality of edge devices; and
an edge network management system comprising a resource deployment subsystem and a quantum computing subsystem, wherein:

the resource deployment subsystem comprises a processor configured to:

determine properties of the edge device network;

transform the determined properties into device changes data, wherein the device changes data indicates a potential malicious attack on a first edge device of the plurality of edge devices based on an increase in an amount of memory utilized within a time interval by the first edge device;

determine an anomaly is detected based at least in part on the device changes data of the edge device network, wherein the device changes data comprise features of the edge device network that are linked to a potential security compromise or that impact efficiency of the edge device network, and further wherein the anomaly is determined by determining that one or more properties of the edge device network are outside a predefined range of property values;

after determining the anomaly is detected, execute a first artificial intelligence (AI) algorithm using real attack data and input noise data as input to train the first AI algorithm, wherein the first AI algorithm is configured to generate as output one or more generated attacks, wherein the one or more generated attacks are utilized by the quantum computing subsystem as one or more simulated attacks for testing a resiliency of the edge device network based on the device changes data and wherein the first AI algorithm is a deconvolutional neural network;

train a second AI algorithm with the one or more generated attacks and the real attack data as input to generate the device changes data as output, wherein the second AI algorithm is a convolutional neural network;

determine, by the second AI algorithm, an error during the training of the second AI algorithm; and input the determined error into the first AI algorithm to update the first AI algorithm;

the quantum computing subsystem is configured to:

execute the at least one of the one or more simulated attacks in a plurality of available configurations of the edge device network; and determine, based at least in part on results of the executed simulated attacks, a security score for each of the plurality of configurations; and the processor of the resource deployment subsystem is further configured to:

determine a selected configuration of the plurality of available configurations of the edge device network based at least in part on the security score determined for each of the plurality of configurations; and implement the selected configuration at the edge device network by allocating additional computational resources to the first edge device that was utilizing the increased amount of memory.

2. The system of claim 1, wherein the processor of the resource deployment subsystem is further configured to:

detect one or more changes to the edge device network using the first AI algorithm, wherein the detected changes increase a susceptibility of the edge device network to security compromise; and determine the anomaly is detected based at least in part on the detected one or more changes.

3. The system of claim 1, wherein the determined anomaly comprises one or more of a change in hardware or hardware configuration of one or more of the edge devices, a change in software or software configuration of one or more of the edge devices, and a change in security policy of one or more of the edge devices.

4. The system of claim 1, wherein the quantum computing subsystem is further configured to simultaneously simulate attacks in the plurality of available configurations, wherein the plurality of available configurations comprise configurations of the edge device network includes one or more edge devices with modified memory capacity, modified application privileges, modified access to data, and modified encryption settings.

5. The system of claim 1, wherein the processor of the resource deployment subsystem is further configured to adjust a configuration and security policy of the edge device network based at least in part on the security score determined for each of the plurality of configurations, wherein the configuration and security policy comprises one or more rules or policies for: (i) allowing or denying application access privileges for one or more of the edge devices, (ii) allowing or denying data access to one or more of the edge devices, (iii) requiring additional data validation at one or more of the edge devices, (iv) requiring data encryption at one or more of the edge devices, (v) requiring increased data monitoring at one or more of the edge devices, (vi) quarantining one or more of the edge devices, (vii) requiring geo-fencing of one or more of the edge devices, and (vii) blocking data transmission to and/or from one or more of the edge devices based on time.

6. The system of claim 1, wherein the selected configuration has a lowest security score of the plurality of available configurations.

7. The system of claim 1, wherein the processor of the resource deployment subsystem is further configured to implement the selected configuration at the edge device by temporarily quarantining the first edge device, wherein a first security score associated with the first edge device is greater than a threshold value.

8. A method, comprising:

determining properties of an edge device network, the edge device network comprising a plurality of edge devices configured to execute computing tasks of the edge network;

transforming the determined properties into device changes data, wherein the device changes data indicates a potential malicious attack on a first edge device of the plurality of edge devices based on an increase in an amount of memory utilized within a time interval by the first edge device;

determining an anomaly is detected based at least in part on the device changes data of the edge device network, wherein the device changes data comprise features of the edge device network that are linked to a potential security compromise or that impact efficiency of the edge device network, and further wherein the anomaly is determined by determining that one or more properties of the edge device network are outside a predefined range of property values;

after determining the anomaly is detected, executing a first artificial intelligence (AI) algorithm using real attack data and input noise data as input to train the first AI algorithm, wherein the first AI algorithm is configured to generate as output one or more generated attacks, wherein the one or more generated attacks are utilized by a quantum computing subsystem as one or more simulated attacks for testing a resiliency of the edge device network based on the device changes data and wherein the first AI algorithm is a deconvolutional neural network;

training a second AI algorithm with the one or more generated attacks and the real attack data as input to generate the device changes data as output, wherein the second AI algorithm is a convolutional neural network;

determining, by the second AI algorithm, an error during the training of the second AI algorithm;

inputting the determined error into the first AI algorithm to update the first AI algorithm;

executing at least one of the one or more simulated attacks in a plurality of available configurations of the edge device network;

determining, based at least in part on results of the executed simulated attacks, a security score for each of the plurality of configurations;

determining a selected configuration of the plurality of available configurations of the edge device network based at least in part on the security score determined for each of the plurality of configurations; and implementing the selected configuration at the edge device network by allocating additional computational resources to the first edge device that was utilizing the increased amount of memory.

9. The method of claim 8, further comprising:

detecting one or more changes to the edge device network using the first AI algorithm, wherein the detected changes increase a susceptibility of the edge device network to security compromise; and determining the anomaly is detected based at least in part on the detected one or more changes.

10. The method of claim 8, wherein the determined anomaly comprises one or more of a change in hardware or hardware configuration of one or more of the edge devices, a change in software or software configuration of one or more of the edge devices, and a change in security policy of one or more of the edge devices.

11. The method of claim 8, further comprising simultaneously simulating attacks in the plurality of available configurations, wherein the plurality of available configurations comprise configurations of the edge device network includes one or more edge devices with modified memory capacity, modified application privileges, modified access to data, and modified encryption settings.

12. The method of claim 8, further comprising adjusting a configuration and security policy of the edge device network based at least in part on the security score determined for each of the plurality of configurations, wherein the configuration and security policy comprises one or more rules or policies for: (i) allowing or denying application access privileges for one or more of the edge devices, (ii) allowing or denying data access to one or more of the edge devices, (iii) requiring additional data validation at one or more of the edge devices, (iv) requiring data encryption at one or more of the edge devices, (v) requiring increased data monitoring at one or more of the edge devices, (vi) quarantining one or more of the edge devices, (vii) requiring geo-fencing of one or more of the edge devices, and (vii) blocking data transmission to and/or from one or more of the edge devices based on time.

13. The method of claim 8, wherein the selected configuration has a lowest security score of the plurality of available configurations.

14. The method of claim 8, further comprising implementing the selected configuration at the edge device by temporarily quarantining the first edge device, wherein a first security score associated with the first edge device is greater than a threshold value.

15. An edge network management system comprising a resource deployment subsystem and a quantum computing subsystem, wherein:

the resource deployment subsystem comprises a processor configured to:

determine properties of an edge device network, the edge device network comprising a plurality of edge devices configured to execute computing tasks of the edge network;

transform the determined properties into device changes data, wherein the device changes data indicates a potential malicious attack on a first edge device of the plurality of edge devices based on an increase in an amount of memory utilized within a time interval by the first edge device;

determine an anomaly is detected based at least in part on the device changes data of the edge device network, wherein the device changes data comprise features of the edge device network that are linked to a potential security compromise or that impact efficiency of the edge device network, and further wherein the anomaly is determined by determining that one or more properties of the edge device network are outside a predefined range of property values;

after determining the anomaly is detected, execute a first artificial intelligence (AI) algorithm using real attack data and input noise data as input to train the first AI algorithm, wherein the first AI algorithm is configured to generate as output one or more generated attacks, wherein the one or more generated attacks are utilized by the quantum computing subsystem as one or more simulated attacks for testing a resiliency of the edge device network based on the device changes data and wherein the first AI algorithm is a deconvolutional neural network;

train a second AI algorithm with the one or more generated attacks and the real attack data as input to generate the device changes data as output, wherein the second AI algorithm is a convolutional neural network;

determine, by the second AI algorithm, an error during the training of the second AI algorithm; and input the determined error into the first AI algorithm to update the first AI algorithm;

the quantum computing subsystem is configured to:

execute at least one of the one or more simulated attacks in a plurality of available configurations of the edge device network; and determine, based at least in part on results of the executed simulated attacks, a security score for each of the plurality of configurations; and the resource deployment subsystem is further configured to:

determine a selected configuration of the plurality of available configurations of the edge device network based at least in part on the security score determined for each of the plurality of configurations; and implement the selected configuration at the edge device network by allocating additional computational resources to the first edge device that was utilizing the increased amount of memory.

16. The edge network management system of claim 15, wherein the processor of the resource deployment subsystem is further configured to:

detect one or more changes to the edge device network using the first AI algorithm, wherein the detected changes increase a susceptibility of the edge device network to security compromise; and determine the anomaly is detected based at least in part on the detected one or more changes.

17. The edge network management system of claim 15, wherein the determined anomaly comprises one or more of a change in hardware or hardware configuration of one or more of the edge devices, a change in software or software configuration of one or more of the edge devices, and a change in security policy of one or more of the edge devices.

18. The edge network management system of claim 15, wherein the quantum computing subsystem is further configured to simultaneously simulate attacks in the plurality of available configurations, wherein the plurality of available configurations comprise configurations of the edge device network includes one or more edge devices with modified memory capacity, modified application privileges, modified access to data, and modified encryption settings.

19. The edge network management system of claim 15, wherein the processor of the resource deployment subsystem is further configured to adjust a configuration and security policy of the edge device network based at least in part on the security score determined for each of the plurality of configurations, wherein the configuration and security policy comprises one or more rules or policies for: (i) allowing or denying application access privileges for one or more of the edge devices, (ii) allowing or denying data access to one or more of the edge devices, (iii) requiring additional data validation at one or more of the edge devices, (iv) requiring data encryption at one or more of the edge devices, (v) requiring increased data monitoring at one or more of the edge devices, (vi) quarantining one or more of the edge devices, (vii) requiring geo-fencing of one or more of the edge devices, and (vii) blocking data transmission to and/or from one or more of the edge devices based on time.

20. The edge network management system of claim 15, wherein the selected configuration has a lowest security score of the plurality of available configurations.

* * * * *